July 8, 1969
R. R. HAWKINS ET AL
3,454,853
TRACER SERVO CONTROL APPARATUS FOR A MACHINE TOOL WITH
SLOW DOWN MEANS FOR THE FEED AXIS
Filed April 6, 1967
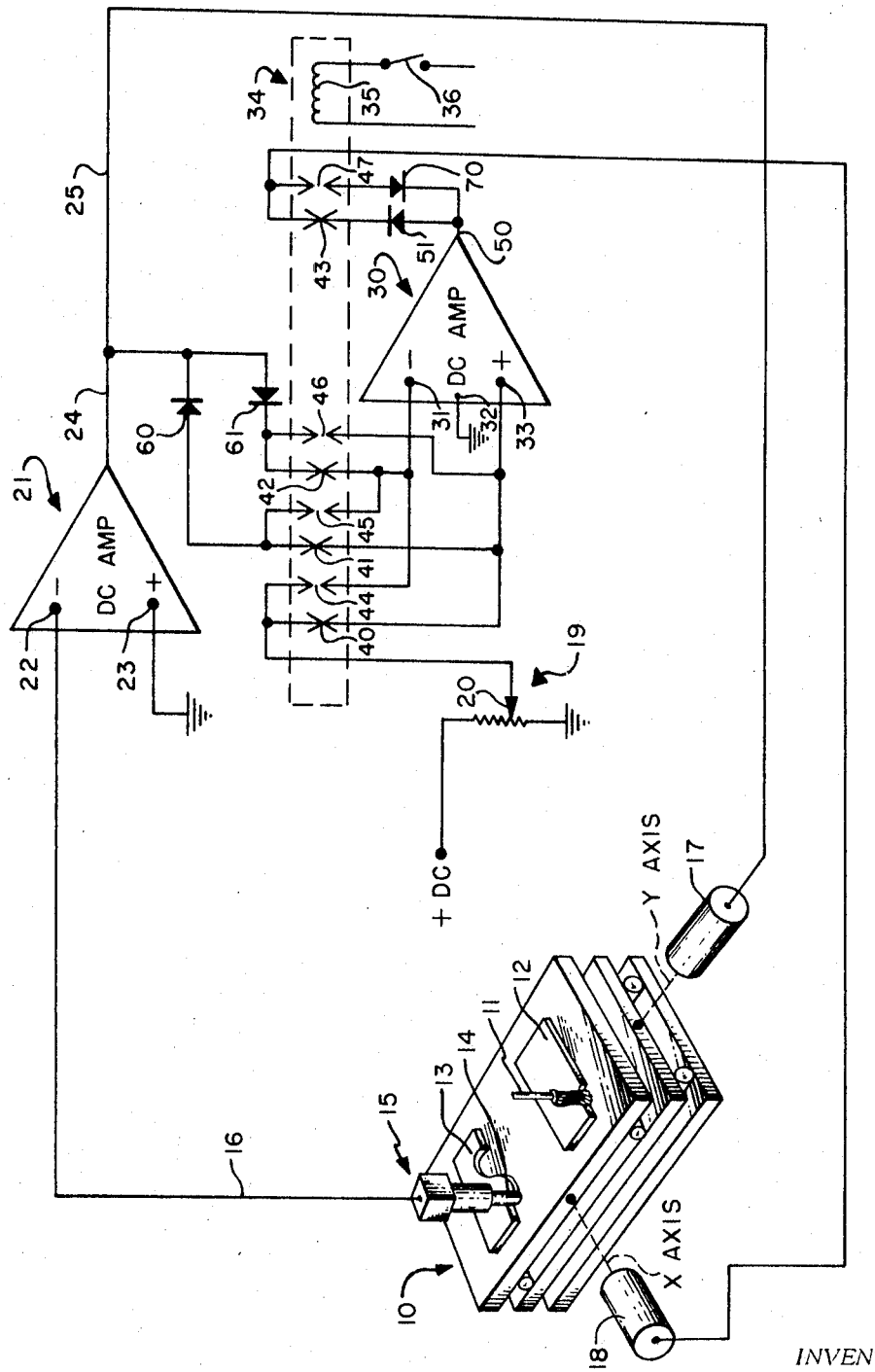
INVENTOR.
ROYAL R. HAWKINS
THEAN CHYE ONG
BY
ATTORNEY

United States Patent Office 3,454,853
Patented July 8, 1969

3,454,853
TRACER SERVO CONTROL APPARATUS FOR A MACHINE TOOL WITH SLOW DOWN MEANS FOR THE FEED AXIS
Royal R. Hawkins, Bloomington, and Thean Chye Ong, Minneapolis, Minn., assignors to Honeywell Inc., Minneapolis, Minn., a corporation of Delaware
Filed Apr. 6, 1967, Ser. No. 628,857
Int. Cl. H02p 1/54, 5/46, 7/68
U.S. Cl. 318—18                    10 Claims

ABSTRACT OF THE DISCLOSURE

A tracer control apparatus with a slowdown feature for the feed axis, provided by two oppositely poled diodes to sense the polarity of the DC trace signal and to connect the trace signal to the noninverting or inverting inputs of a DC feed axis amplifier such that the trace signal always opposes the feed rate signal, and with switch means to reverse the sense of the input connections of the DC amplifier to reverse the direction of feed.

Background of the invention

The prior art provides structure to automatically proportionally slow down or stop the feed axis motion of a machine tool whenever the tracer head signal calls for motion along the transverse or trace axis.

Our invention relates to an improved structure to provide slowdown.

Summary of the invention

Our invention provides slowdown by means of a pair of diodes which are oppositely poled and are interconnected between the tracer head signal circuit and the feed axis signal circuit. The tracer head signal is DC of reversible polarity, depending upon over-deflection or under-deflection of the stylus of the tracer head. The presence of the tracer head signal indicates that the contour of the template is other than parallel to the feed axis, thus slowdown of the feed axis is necessaray for more accurate tracing.

Our invention utilizes a DC feed axis amplifier having an inverting input and a noninverting input to handle the feed axis signal. The above mentioned diodes are connected, one to the inverting input and one to the noninverting input, such that the tracer head signal always opposes the feed axis signal to produce slowdown.

We provide diode structure at the output of the DC amplifier to insure that the machine tool feed axis motor cannot be reverse energized during a given tracing operation.

We also provide a feed direction relay which reverses the sense of the connection of the inputs of the DC amplifier and which reverses the sense of the output of the DC amplifier, to reverse the direction of motion along the feed axis of the machine tool.

Brief description of the invention

The single figure is a schematic showing of the preferred embodiment of our invention, showing our invention connected to control a machine tool.

Description of the preferred embodiment

Referring to the single figure, reference numeral 10 identifies generally a machine tool, including tool 11 adapted to cooperate with workpiece 12 to reproduce the contour of template 13. Template 13 is engaged by stylus 14 which forms a portion of tracer head assembly 15. Tracer head assembly 15 is constructed and arranged to provide substantially zero output voltage when stylus 14 is deflected to normal position by engagement with template 13. When stylus 14 is over deflected or under deflected from the normal position, a DC voltage of reversible polarity is applied to line 16. For example, this polarity DC voltage may be positive for over deflection and negative for under deflection.

The voltage present on line 16 controls the trace axis of the machine tool, this being the Y axis, whose movement is controlled by DC responsive motor 17, in a manner to be described. The X axis is the feed axis of the machine tool and movement along this axis is controlled by DC responsive motor 18, in a manner to be described.

A command signal for the control of the machine tool in the feed axis is provided by potentiometer 19 having a terminal connected to a positive source of DC voltage, a terminal connected to a reference potential, and a movable wiper 20.

Reference numeral 21 identifies a DC amplifier having input terminals 22 and 23. DC amplifier 21 may be an inverting amplifier, such that the voltage on line 16 is inverted, amplified and applied to line 24. Thus, the voltage on line 24 is negative for over-deflection and positive for under-deflection. Line 24 is connected to control movement of motor 17 by way of line 25. Tracer head assembly 15 and DC amplifier 21 are considered to be a tracer head means. Motor 17 is responsive to the polarity of voltage on line 25. When a negative voltage is applied thereto (in the case of over deflection of stylus 14), the table of the machine tool moves away from motor 17, tending to restore stylus 14 to its normal position. When a positive voltage is applied to motor 17 (in the case of under-deflection of stylus 14), motor 17 moves the table toward motor 17, increasing the deflection of stylus 14. In this manner, stylus 14 is maintained at or near its normal position of deflection.

Line 25 may include a servoamplifier, if needed for proper control of motor 17, or to facilitate the selection of different type motors.

Reference numeral 30 identifies a second DC amplifier having input terminals 31, 32 and 33. Input terminal 32 is connected to reference potential. Input terminal 31 is an inverting input terminal whereas input terminal 33 is a noninverting input terminal.

Reference numeral 34 identifies generally a feed direction relay having a winding 35 and switches 40–47. Switch 36 controls the state of energization of winding 35. With winding 35 de-energized, as shown, switches 40, 41, 42 and 43 are closed, and switches 44, 45, 46 and 47 are open. To change the direction of movement in the feed axis of the machine tool, switch 36 is closed, causing switches 44, 45, 46 and 47 to close and switches 40, 41, 42 and 43 to open.

Assuming that switch 36 is open as shown, the positive voltage present at wiper 20 is applied to input terminal 33 of DC amplifier 30 through switch 40. This positive voltage is amplified and appears at output 50 as a positive voltage. This positive voltage is applied to feed axis motor 18 through diode 51 and switch 43. Thus, motor 18 is irreversibly controlled, for a particular mode of trace, to drive the table of the machine tool, moving the machine tool toward motor 18 as stylus 14 traces template 13 and as tool 11 works workpiece 12.

Whenever stylus 14 becomes over- or under-deflected, as when the surface of template 13 changes direction from parallel to the X axis, an over or under deflection voltage is produced at lines 24 and 25. The voltage on line 25 controls trace axis motor 17 and creates motions to maintain proper deflection of stylus 14.

This over- or under-deflection voltage is also applied to one of the two inputs 31 or 33 of DC amplifier 30, as determined by diodes 60 and 61. If it is assumed that a negative over deflection voltage is present on line 24, this negative voltage is applied to noninverting input 33 of DC amplifier 30 through diode 60 and switch 41. This negative voltage appears as a negative voltage at output 50 and reduces the effect of the positive voltage on wiper 20, thus causing a slowdown of motor 18.

If it is assumed that a positive under deflection voltage is present at line 24, this positive voltage is applied to inverting input 31 of DC amplifier 30 by way of diode 61 and switch 42. This positive voltage is inverted by DC amplifier 30 and appears as a negative voltage at output 50, again reducing the effect of the positive feed voltage on wiper 20. Here again, the energization of feed axis motor 18 is reduced.

If it is desired to change the direction of trace, to trace from the righthand side of template 13 towards the lefthand side, switch 36 is closed. This switch reverses the sense of all connections to input terminals 31 and 33 of DC amplifier 30 and reverses the sense of the voltage which may control motor 18 by substituting a diode 70 for diode 51.

Diodes 70 and 51 are connected to output 50 to insure that motor 18 may not be reversibly energized during a particular mode of trace.

Switches 40 and 44 reverse the sense of the connection of wiper 20 to the inputs of amplifier 30. An alternate scheme to produce this end result would be to connect wiper 20 to terminal 33 and to utilize switches 40 and 44 to reverse the polarity of voltage applied to the upper terminal of the resistance element of potentiometer 19.

In the embodiment shown, switch 44 connects potentiometer wiper 20 to inverting input 31 while switch 40 disconnects the wiper from noninverting input 30. Switch 45 connects dode 60 to inverting input 31 while switch 41 disconnects this diode from noninverting input 33. Switch 46 connects diode 61 to noninverting input 33 while switch 42 disconnects this diode from inverting input 31. Switch 47 connects the output of amplifier 30 to motor 18 through diode 70 which is poled in a reverse manner from diode 51, and switch 43 disconnects diode 51.

The embodiments of the invention in which an exclusive property or right is claimed are defined as follows:

1. Tracer control apparatus, for use with a machine tool having a tool and a template and adapted to hold a work member to be worked by the tool, with the tool and work member being adapted to move relative to each other along a first and second intersecting axis; the tracer control apparatus comprising:
    tracer head means having stylus means, adapted to be mounted on the machine tool, and adapted to engage the template to be deflected by engagement therewith and to move in relation thereto as the tool moves in relation to the work member, said tracer head means providing a reversible polarity DC signal which is one of a first or an opposite polarity upon over-deflection of said stylus means from a normal position, and is of the other of said first or said opposite polarity upon under-deflection of said stylus means from said normal position,
    means connected to said tracer head means to be controlled by said signal and adapted to control movement of the machine tool along one of the axes,
    control means to provide a DC signal,
    a DC amplifier having an inverting input, a noninverting input, and an output,
    output means including the output of said DC amplifier adapted to control movement of the machine tool along the other axis,
    circuit means connecting said control means to one of the inputs of said DC amplifier,
    and polarity sensitive circuit means connecting said tracer head means to both of the inputs of said DC amplifier in a manner such that the reversible polarity DC signal of said tracer head means opposes the DC signal of said control means.

2. The tracer control apparatus as defined in claim 1 wherein said control means provides a DC signal of said first polarity and wherein said polarity sensitive circuit means connects said tracer head means to both of the inputs of said DC amplifier in a manner such that a tracer head means signal of said first polarity is connected to the other of the inputs of said DC amplifier, and a tracer head means signal of said opposite polarity is connected to said one of the inputs of said DC amplifier.

3. The tracer control apparatus as defined in claim 2 wherein said polarity sensitive circuit means includes first unidirectional current conducting means poled to connect a tracer head means signal of said first polarity to said other input of said DC amplifier, and second unidirectional conducting means poled to connect a tracer head means signal of said opposite polarity to said one input of said DC amplifier.

4. The tracer control apparatus as defined in claim 3 including switch means adapted when actuated to transfer the connection of said control means from said one input of said DC amplifier to said other input, to transfer the connection of said tracer head means signal of said first polarity from said other input of said DC amplifier to said one input, and to transfer the connection of said tracer head means signal of said opposite polarity from said one input of said DC amplifier to said other input.

5. The tracer control apparatus as defined in claim 2 wherein said output means includes unidirectional current conducting means poled to apply only a DC signal of said first polarity to control movement of the machine tool along said other axis.

6. The tracer control apparatus as defined in claim 4 wherein said output means includes first unidirectional current conducting means connected to the output of said DC amplifier and poled to apply only a DC signal of said first polarity to control movement of the machine tool along said other axis, wherein said output means includes second unidirectional current conducting means connected to the output of said DC amplifier and poled opposite to said first unidirectional current conducting means, and wherein said switch means when actuated transfers the connection of the output of said DC amplifier from said first unidirectional current conducting means to said second unidirectional current conducting means to apply only a DC signal of said opposite polarity to control movement of the machine tool along said other axis.

7. The tracer control apparatus as defined in claim 2 wherein said polarity sensitive circuit means includes a first diode poled to connect a tracer head means signal of said first polarity to said other input of said DC amplifier, and a second diode poled to connect a tracer head means signal of said opposite polarity to said one input of said DC amplifier.

8. The tracer control apparatus as defined in claim 7, including switch means having a first and a second state, effective when in said first state to connect said control means to said one input of said DC amplifier and effective when in said second state to connect said control means to said other input; effective when in said first state to connect said first diode to said other input of said DC amplifier and effective when in said second state to connect said first diode to said one input; and effective when in said first state to connect said second diode to said one input of said DC amplifier and effective when in said second state to connect said second diode to said other input.

9. The tracer control apparatus as defined in claim 7 wherein said output means includes a third diode pole to apply only a DC signal of said first polarity to control movement of the machine tool along said other axis.

10. The tracer control apparatus as defined in claim 8, wherein said output means includes a third and a fourth diode, and wherein said switch means when in said first state connects said third diode to the output of said DC amplifier poled to apply a DC signal of said first polarity to control movement of the machine tool along said other axis, and when in said second state connects said fourth diode to the output of said DC amplifier poled to apply a DC signal of said opposite polarity to control movement of the machine tool along said other axis.

References Cited

UNITED STATES PATENTS 2,410,295 10/1946 Kuehni et al.
2,640,176 5/1953 Calosi.
2,673,951 3/1954 Morel.

ORIS L. RADER, *Primary Examiner.*

THOMAS E. LYNCH, *Assistant Examiner.*

U.S. Cl. X.R.

318—31